(12) United States Patent
Rogers et al.

(10) Patent No.: US 6,584,932 B2
(45) Date of Patent: Jul. 1, 2003

(54) SQUIRREL PROOF BIRD FEEDER

(76) Inventors: Peter T. Rogers, 511 Houston St., Batavia, IL (US) 60510; Charles B. Kirkwood, 441 Cleveland Ave., Batavia, IL (US) 60510

( * ) Notice: Subject to any disclaimer, the term of this patent is extended or adjusted under 35 U.S.C. 154(b) by 0 days.

(21) Appl. No.: 09/968,237

(22) Filed: Oct. 1, 2001

(65) Prior Publication Data

US 2003/0062000 A1 Apr. 3, 2003

(51) Int. Cl.[7] ............................................. A01K 39/00
(52) U.S. Cl. ........................................... 119/57.9
(58) Field of Search ........................... 119/57.9, 52.3, 119/57.8, 52.2

(56) References Cited

U.S. PATENT DOCUMENTS

| | | | | | |
|---|---|---|---|---|---|
| 1,189,779 A | * | 7/1916 | Becker | ........ | 119/52.2 |
| 2,475,207 A | * | 7/1949 | Smith | ......... | 119/52.2 |
| 3,124,103 A | * | 3/1964 | Stainbrook | .... | 119/52.3 |
| 3,145,690 A | * | 8/1964 | Bachman | ..... | 119/52.3 |
| 3,241,525 A | * | 3/1966 | Meier | ........ | 119/55 |
| 4,541,362 A | * | 9/1985 | Dehls | ......... | 119/57.9 |
| 5,048,461 A | * | 9/1991 | Wessner | ...... | 119/52.3 |
| 5,062,388 A | * | 11/1991 | Kilham | ...... | 119/52.2 |
| 5,207,181 A | * | 5/1993 | Loken | ........ | 119/57.9 |
| 5,309,867 A | * | 5/1994 | Cruz | .......... | 119/52.3 |
| 5,463,979 A | * | 11/1995 | Fasino | ........ | 119/52.2 |
| 5,490,480 A | * | 2/1996 | Dumond | .... | 119/57.9 |
| 5,676,089 A | * | 10/1997 | Morganson | .. | 119/52.3 |
| 5,964,183 A | * | 10/1999 | Czipri | ........ | 119/52.3 |
| 6,073,582 A | * | 6/2000 | Lush | .......... | 119/51.01 |

* cited by examiner

Primary Examiner—Charles T. Jordan
Assistant Examiner—Susan C. Alimenti

(57) ABSTRACT

A bird feeder having a lid latching mechanism which comprises L-shaped holes on the feeder's lid, and a wire handle having projections that orient above the lid. The projections in the handle align with the sides of the L-shaped holes to prevent the lid from being lifted from the bird feeder. A seed cover over the seed dispensing area is connected to a shaped wire perch via a through-hole. The perch acts as an actuator to close the seed cover, and is counter actuated by an extension spring, which attaches to the seed cover and feeder base.

3 Claims, 7 Drawing Sheets

FIGURE: 1
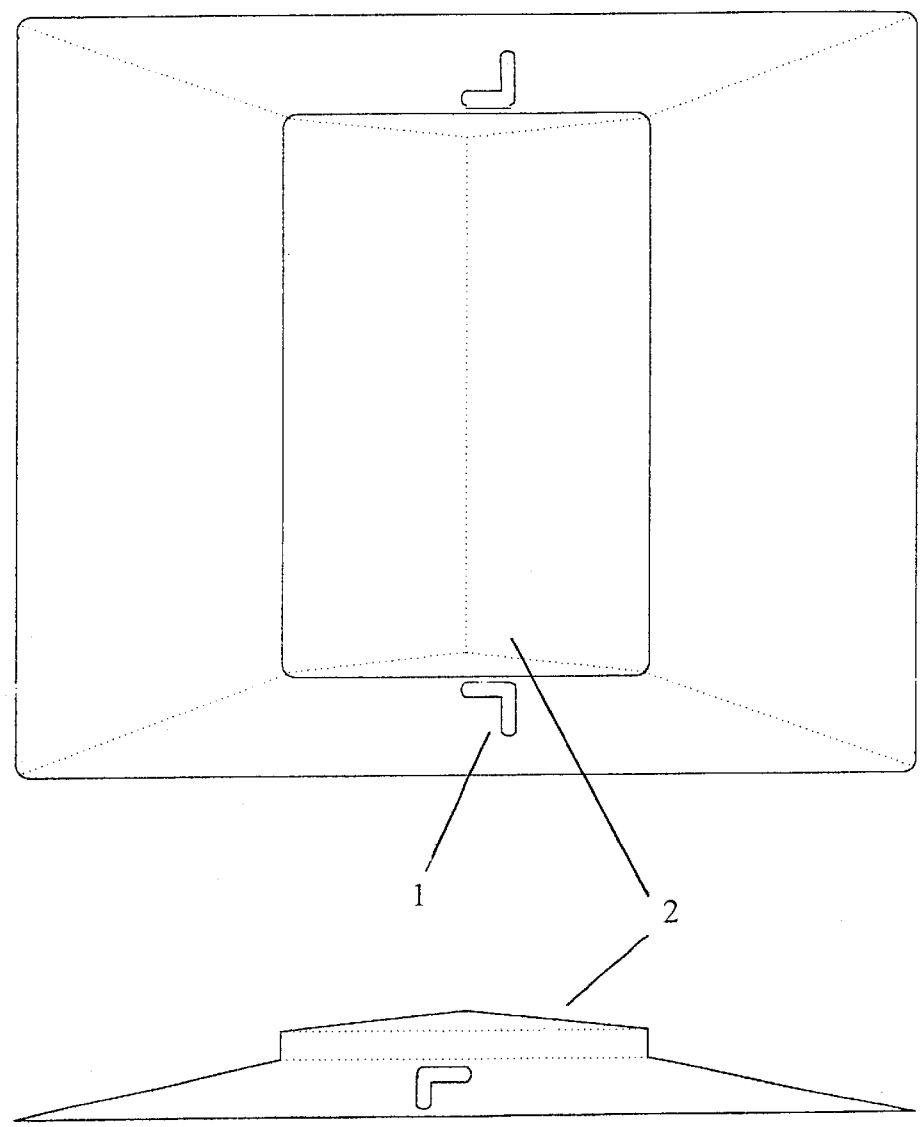

FIGURE: 2
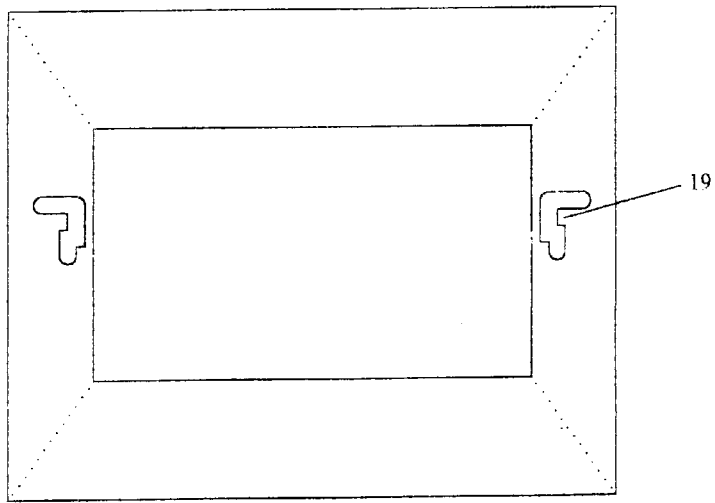

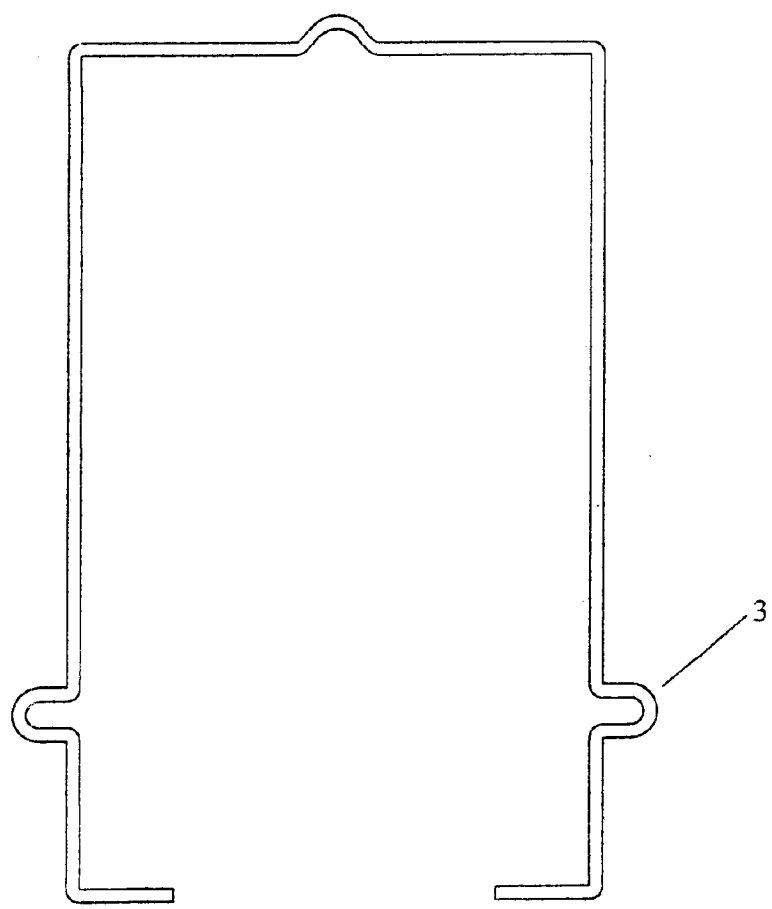
FIGURE: 3

FIGURE: 4
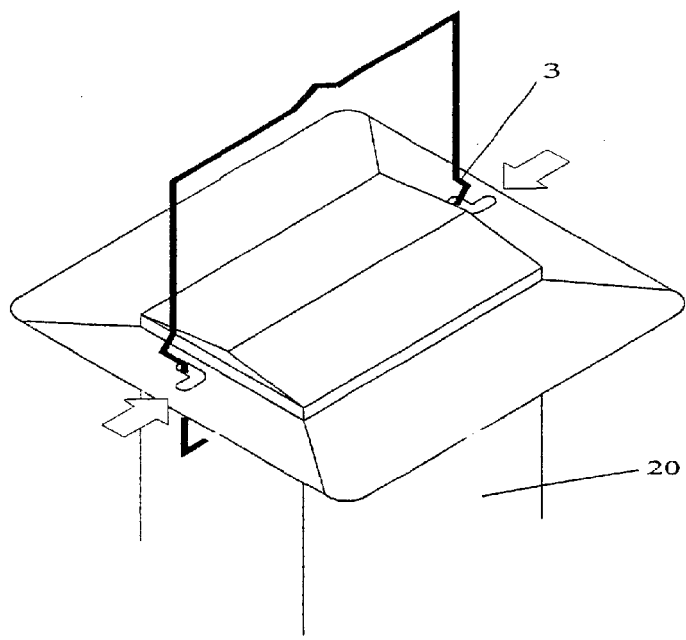

FIGURE: 5
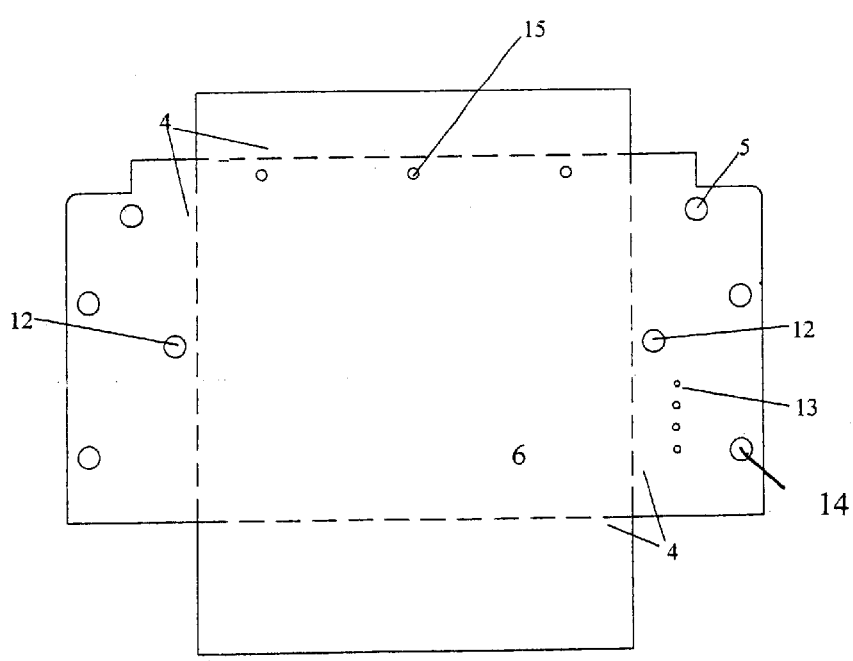

FIGURE: 6
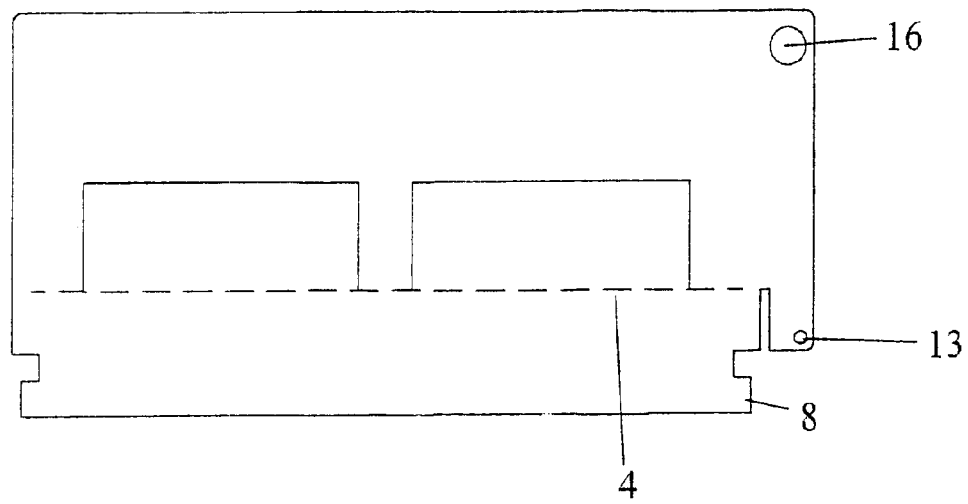

FIGURE: 7
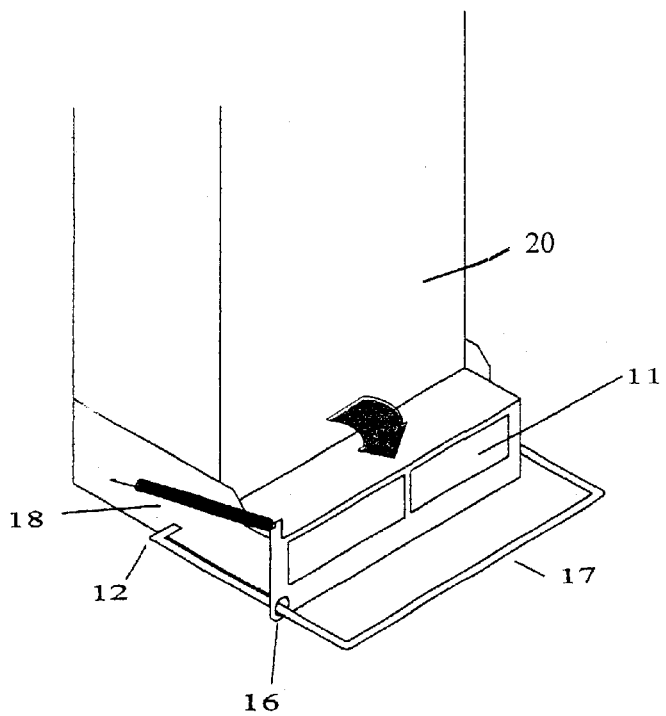

SQUIRREL PROOF BIRD FEEDER

FIELD OF INVENTION

This invention pertains to an improved and simplified means for squirrel proofing a bird feeder; specifically, a latching means for a lid and a closing mechanism on the seed dispensing area of the bird feeder base.

BACKGROUND

There are many bird feeder designs that attempt to thwart unwanted animal species from feeding. One of the most practical and effective designs utilizes a pivot-mounted closing mechanism, wherein the weight of the animal activates a cover to block the seed dispensing area. To further limit access of the seed to squirrels, many feeders incorporate a latching means on the lid that covers the seed holding area.

The type of mechanisms for lid latches and animal activated seed blocking mechanisms seen in prior art usually involves several components, which adds to the complexity and cost of the bird feeder.

The improvements in this invention will simplify the lid latching and seed blocking means, whereby improving its effectiveness and ease of operation, in addition to reducing manufacturing requirements.

This invention will provide an improved and simplified means for latching the lid and closing the seed dispensing area. The resulting benefits will be ease of operation and greater effectiveness. With simplification, the probability of a malfunction will be reduced, and people will be able to easily understand how to use the mechanism for maintenance. Simplicity will also reduce manufacturing requirements, due to fewer parts and less hardware required for assembly.

Regarding the lid latching means, the bird feeder's lid and handle operate together in a way that allows latching to be achieved without the addition of ancillary parts. All that is necessary to create the latching means is making the holes in the lid, where the handle passes, L-shaped and a specially shaped handle that is described in the following description. The shape of the hole and handle is arbitrary with regard to manufacturing; therefore, the latching feature does not increase the cost. Lid latching mechanisms in prior art use ancillary components in addition to the lid or handle such as hooks or clasps. In other prior art, where the handle is used as a latching means, a secondary component is attached to the handle as disclosed in U.S. Pat. No. 2,475,207, by S. M. Smith.

Further advantages will be apparent in the following description with regard to the lid latching means and the seed closing mechanisms.

DESCRIPTION OF DRAWINGS

FIG. 1: top and side view of the lid and means for latching

FIG. 2: stop tab on lid

FIG. 3: wire handle with means to latch lid

FIG. 4. perspective drawing of the lid in communication with wire handle on the seed column FIG. 5: flat view of the base.

FIG. 6: flat view of the seed cover, part of the closing mechanism.

FIG. 7: perspective view of the closing mechanism in communication with the feeder's base.

REFFERENCE NUMERALS FOR DRAWINGS

1: shaped holes
2: depressed area
3: projection in handle
4: fold lines
5: holes—trunnion for pivot
6: floor of feeder base
7: sides of base
8: trunnion tabs to fit trunnion holes
9: welding surface for perch/counterweight
10: perch/counterweight
11: seed dispensing area
12: pivot holes for the perch/actuator
13: spring attachment holes
14: attachment holes for the seed column
15: drainage holes
16: through-hole for perch/actuator
17: perch/actuator
18: spring
19: stop tabs
20: seed column

DESCRIPTION

In the following description, the invention will be separated into two aspects: A) means for latching the lid and B) means for closing seed dispensing area. To prevent access to seed by undesirable animals, a bird feeder could incorporate either aspect, independently or in combination.

A. Means for Latching the Lid

The claimed latching means for a bird feeder lid could have many possible embodiments, including many viable methods and materials for manufacture—stamping and forming out of sheet metal is preferred The lid is formed from a piece of material with desired size and shape. The lid has a means for engaging with the seed column, which could comprise either a depressed area 2, or a flange, that fits over the seed column, FIG. 1. Two L-shaped holes 1 are oriented on the lid's periphery, outside of the depressed cap area, equal distant from its center FIG. 1. Each L-shaped hole 1 comprises two rectangular sections connected in a perpendicular orientation to form an L-shape. A stop-tab 19, FIG. 2, can also be created in the shaped hole 1. The wire handle goes through the shaped holes on the lid, FIG. 4 and attaches to the seed column in a way that will allow the handle to pivot in a front to back direction. Projections 3 are part of the handle, which comprise bends, FIG. 3. When the handle and lid are on the feeder, with the lid in the closed position, the projections 3 are oriented above the lid, FIG.4.

Operation of the Latching Lid

When the lid is on the seed column and the handle is in the vertical position, the projections in the handle are immediately above the lid and lock against sides of the L-shaped holes 1, which prevents the lid from lifting up FIG. 4. When the handle is pivoted back, the projections 3 in the handle align with the area of the L-shaped holes 1 that is perpendicular to the seed column. This position allows the projections 3 in the handle to fit through the lid, whereby allowing the depressed cap area 2 to be lifted off the seed column.

B. Means for Closing the Seed Dispensing Area

The means for closing the seed dispensing area 11 could have many embodiments including many methods and materials for manufacture—stamping and forming out of sheet metal is preferred. The preferred embodiment will be described in the following.

The preferred embodiment comprises a base shown in FIG. 5 with sides that fold up at 90-degree angles to form a tray 4. A floor 6 to the tray is shown. A set of holes 5 are on two sides of the base to form a trunnion for the closing mechanism, a pivot for a perch/ actuator 12, and holes 13 for the attachment of the spring 18. Extending the sides can form a seed column or a separate piece, such as a plastic tube, can be attached with fasteners through holes 14. Drainage holes 15 can be added to the floor as necessary.

A seed cover shown in FIG. 6, stamped and formed out of sheet metal is folded on the dotted lines 4. Trunnion tabs 8 on the seed cover fit into the trunion holes 5 on the sides of the base, which allows the seed cover to pivot to an open or closed position. A hole 13 is in a tab at the top of the closing mechanism to provide an attachment point for a spring 18, and a hole 16 is at the bottom corner for the perch/actuator. A perch/actuator 17 comprising a shaped piece of wire, FIG. 7, goes through the hole on seed cover and fits into the pivot holes 12 on the base, FIG. 7. A spring 18 attaches between the seed cover and the base, FIG. 7.

Operation of Embodiment 1 shown in FIG. 7: a squirrel can push down the perch/actuator 17 which causes the seed cover to close. The perch/actuator communicates with the seed cover through a hole 16 wherein the perch/actuator slides through the hole when the perch pivots down to push the cover to the closed position. The hole 16 is oversized to allow the perch/actuator to slide freely and to compensate for the change in aspect due to the arc of rotation of the closing seed cover. A spring 18, which is attached to the seed cover and to the feeder's base, returns the closing mechanism to the open position. The spring can be an extension coil spring or any type mounted to retract the seed cover. If an extension spring is used, it can be connected to a further attachment point 13 on the base FIG. 5, to increase resistance.

The base can be formed to create a seed dispensing area on the opposite side of the feeder. The closing mechanism can be duplicated on the opposite side of the feeder to create a double-sided squirrel proofing.

We claim:

1. A bird feeder comprising:
    a) a base having a floor and sides
    b) a seed column attached to, or formed from the sides of said base
    c) a seed dispensing area
    d) a lid having two apertures with each aperture comprising two rectangular sections connected in a perpendicular orientation, whereby forming an L-shape
    e) a wire handle having two projections that comprise bends
    f) a means for latching said lid, whereby the wire handle goes through the apertures on the lid with said projections being oriented above the lid to align with the sides of the apertures to prevent the lid from lifting
    g) trunnion holes in the sides of said base
    h) an extension spring
    i) a shaped wire perch/actuator
    j) pivot holes in the sides of said base for attaching said perch actuator
    k) a plurality of attachment points for said extension spring in the side of said base, whereby spring resistance can be adjusted
    l) a seed cover having trunnion tabs, an attachment point for said extension spring, and a through hole for said perch/actuator at the bottom corner,
    m) a means to prevent a squirrel from accessing said seed dispensing area, whereby a squirrel's weight on the perch/actuator caused the seed cover to pivot to a closed position over the seed dispensing area.

2. A bird feeder comprising:
    a) a base having a floor and sides
    b) a seed column attached to, or formed from the sides of said base
    c) a seed dispensing area
    d) a lid having two apertures with each aperture comprising two rectangular sections connected in a perpendicular orientation, whereby forming an L-shape
    e) a wire handle having two projections that comprise bends
    f) a means for latching said lid, whereby the wire handle goes through the apertures on the lid with said projections being oriented above the lid to align with the sides of the apertures to prevent the lid from lifting.

3. The bird feeder of claim 2, further comprising:
    a) trunnion holes in the sides of said base
    b) an extension spring
    c) a shaped wire perch/actuator
    d) pivot holes in the sides of said base for attaching said perch/actuator
    e) a plurality of attachment points for said extension spring in the side of said base, whereby spring resistance can be adjusted
    f) a seed cover having trunnion tabs, an attachment point for said extension spring, and a through hole for said perch/actuator at the bottom corner
    g) a means to prevent a squirrel from accessing said seed dispensing area, whereby a squirrel's weight on the perch/actuator causes the seed cover to pivot to a closed position over the seed dispensing area.

* * * * *